United States Patent Office 3,197,488
Patented July 27, 1965

3,197,488
SYNTHESIS OF KETO-CARBOXYLIC ACIDS
AND KETONES
John B. Braunwarth and Charanjit Rai, Crystal Lake, Ill., assignors to The Pure Oil Company, Palatine, Ill., a corporation of Ohio
No Drawing. Filed Nov. 15, 1962, Ser. No. 238,040
14 Claims. (Cl. 260—347.3)

This invention relates to a method of preparing esters of keto-carboxylic acids, keto-carboxylic acids, and diketones and, more particularly, to the preparation of these products by the reaction of cycloalkanol hydroperoxides or alkylcycloalkyl hydroperoxides with an aldehyde under reduction-oxidation conditions.

Many reactions of hydroperoxides are known in the prior art. E. G. E. Hawkins in his article entitled "Reactions of Organic Peroxides, Part II, Reactions of $\alpha,\alpha$-Dimethylbenzyl Hydroperoxide ('Iso-Propylbenzene Hydroperoxide')" (J. Chem. Soc. 1950, 2169), shows the decomposition of $\alpha,\alpha$-dimethylbenzyl hydroperoxide by ferrous sulfate under the influence of various catalysts and under thermal conditions to form mixtures of 2-phenylpropan-2-ol, acetophenone, and $\alpha$-methylstyrene. The hydroperoxides were first shown by Hock and Lang, Ber. 77, 257 (1944), to be formed by the oxidation of isopropylbenzene with air to give $Ph.CMe_2OOH$. Improved methods for their preparation are described by Armstrong, Hall and Quin, British Patents 610,293 and 630,286; J. Chem. Soc. 1950, 666. E. G. E. Hawkins and P. P. Young (J. Chem. Soc. 1950, 2804) state that the reaction of methylcyclopentyl hydroperoxide with ferrous sulfate solution gives rise to the formation of dodecane-2,11-dione However, the use of methylcyclohexyl hydroperoxide gives poorer yields of tetradecane-2,13-dione. N. Brown et al., J. Am. Chem. Soc. 77, 1756 (1955), describe the preparation of "cyclohexanone peroxide" by the auto-catalyzed, liquid-phase oxidation of cyclohexanol with oxygen. Reaction of these peroxides with the ferrous ion in hydrocarbon solution is said by Brown et al. to produce a 68% yield of 1,12 dodecanedoic acid. M. S. Kharasch and W. Nudenberg in their article entitled, "Detection of Free Radicals in Solution, III, Formation of Long-Chain, $\alpha,\omega$-Dicarboxylic Acids" (J. Org. Chem. 19, 1921 (1954)), indicate that unsaturated dicarboxylic acids of 20 carbon atoms are formed from cyclohexanone peroxide and butadiene.

The formation of diketones and dibasic acids is assumed to take place by the rearrangement of an alkoxy radical to an open-chain carbon radical, followed by dimerization, thus:

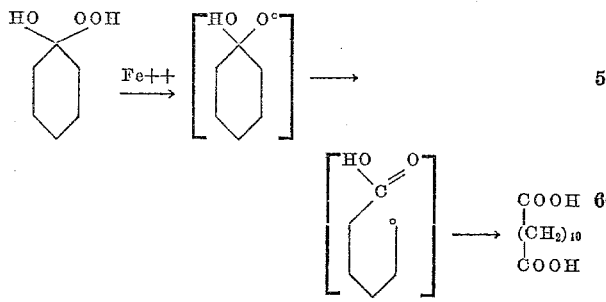

In the case of the $C_{20}$ dicarboxylic acids, the intermediate radical adds to the butadiene before dimerization.

In United States Patent 2,933,525 a method of preparing tetracarboxylic acids and diketo-dicarboxylic acids and, more particularly, to the preparation of these products by the reaction of cycloalkanol hydroperoxides or alkylcycloalkyl hydroperoxides with alpha, beta-unsaturated carboxylic acids under reduction-oxidation conditions is disclosed. The prior art also discloses the preparation of ketocarboxylic acids by the permanganate oxidation of a 1-alkyl-1,2-cycloalkandiol to give an alkyl ketoalkanoic acid. The present invention is an improvement thereover.

It has been found in accordance with this invention that when compounds of a cyclic structure having a peroxide grouping attached directly to one of the carbon atoms in the cyclic structure, as cycloalkanol hydroperoxide and alkyl cycloalkyl hydroperoxide, are decomposed by the presence of reduction-oxidation conditions in the presence of an aldehyde, the main products are monoketomonocarboxylic acids or monoketocarboxylic esters or diketones as desired. The resulting products are useful as intermediates in the preparation of synthetic lubricants, plasticizers, resins and fibers. The primary object of this invention is to provide a method of preparing monoketomonocarboxylic acids and monoketomonocarboxylic esters, and compositions of matter containing same, by the reaction of an aldehyde with cyclic peroxides and hydroperoxides under redox conditions.

The reaction involved in the process of this invention may be represented broadly as follows:

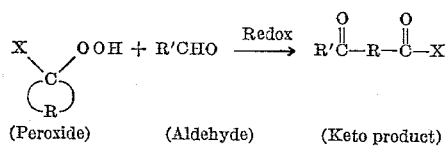

(Peroxide)     (Aldehyde)     (Keto product)

wherein X is selected from the group of $C_1$ to $C_6$ alkyl radicals which may be straight-chain or branched-chain, or a hydroxyl group; R is a divalent organo radical containing from 3 to 9 carbon atoms in the unsubstituted methylene groups or polymethylene groups, or R may contain one or more substituents attached to a ring carbon atom which substituents do not interfere with the reaction; and R' can be any organic radical. Where R'CHO is a dialdehyde, i.e., $R'(CHO)_2$ compounds of the formula

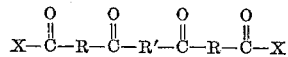

are formed, examples of which are illustrated hereinafter.

From this definition, it is seen that when X is an alkyl group the product is a diketone, and when X is hydroxyl the product is a ketoacid and if an esterifying alcohol is present, as a solvent, the corresponding ester of a ketoacid is formed. Also it is apparent that this invention is directed to a process of preparing keto products by the reaction of a cyclic peroxide or cyclic hydroperoxide with any aldehyde under redox conditions wherein the number of carbon atoms in the divalent R group of the peroxide reactant remains unchanged.

Examples of $C_1$ to $C_6$ alkyl groups included in the definition X are methyl, ethyl, propyl, isopropyl, butyl, isobutyl, tertiary butyl, pentyl, isopentyl, hexyl and isohexyl groups.

Non-limiting examples of R groups in the above equation and formula include:

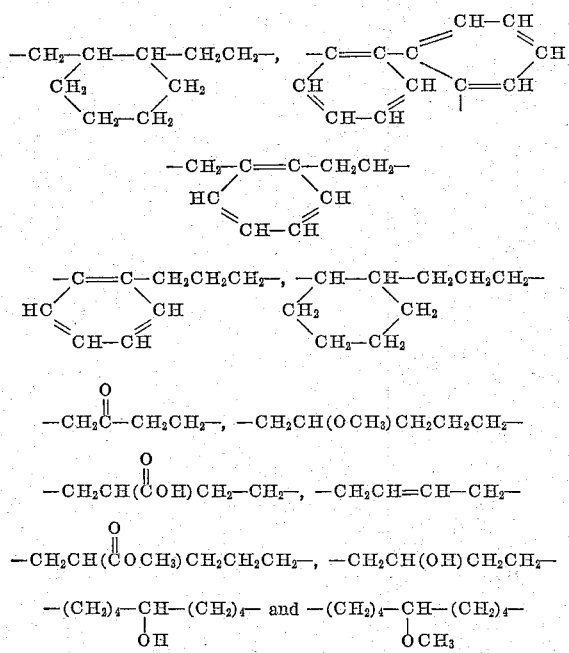

The preferred R groups are trimethylene, tetramethylene, pentamethylene and hexamethylene groups; since the carbon atom attaching to the X group and to the OOH group is not included in the definition of R, the number of carbon atoms in the cyclic group becomes 4 to 10. The non-interfering substituents which may be attached to a cyclic carbon atom of the R group include, but are not limited to, as an embodiment of this invention $C_1$ to $C_4$ alkyl such as methyl, ethyl, propyl, isopropyl, butyl, isobutyl, t-butyl, aryl and aralkyl, such as phenyl and benzyl, cycloaliphatic, such as cyclopentyl and cyclohexyl, alkoxy such as ethoxy, propoxy, butoxy, pentoxy and hexoxy groups containing only carbon, hydrogen and oxygen and such other groups as chloro, fluoro and hydroxy and similar substituents.

R' of the aldehyde reactant and products of this invention as hereinafter more fully defined, can be any organic radical and for purposes of illustration can be $C_1$ to $C_{20}$ alkyl of straight or branched chain configuration, $C_2$ to $C_8$-alkylene, $C_6$ to $C_{18}$-aryl, $C_1$ to $C_6$-alkyl-substituted $C_6$ to $C_{18}$-aryl, $C_6$ to $C_{18}$-aryl-substituted $C_1$ to $C_6$-alkyl, $C_3$ to $C_9$-cycloaliphatic and heterocyclic radicals containing one or more oxygen, nitrogen and sulfur heteroatoms.

The peroxide or hydroperoxide starting materials used in this invention are well known and their properties fairly well defined. The term "peroxide compound" will be used herein to broadly cover compounds of formulas set forth above and to include compounds which in a stirct sense are defined as hydroperoxides. The preferred starting materials are the peroxides of the type obtainable by treating cycloalkanols or alkyl cycloalkanes with oxygen or by the reaction of cycloalkonones with hydrogen peroxide. Examples are the peroxide compounds obtained by reacting hydrogen peroxide with cyclopentanone and cyclohexanone where R is —(CH$_2$)$_4$— and

—(CH$_2$)$_5$— respectively, particularly the reaction products of hydrogen peroxide and cycloalkanones and the oxidation products of cycloalkanols and alkyl cycloalkanes. Following the above definitions for R and X, these products include cyclopentanone peroxide, cyclohexanone peroxide, cycloheptanone peroxide, methylcyclohexane hydroperoxide, ethylcyclopentane hydroperoxide, etc.

The hydroperoxide can either be prepared in situ, by reaction of a cyclic ketone with hydrogen peroxide and then addition of the aldehyde followed by ferrous salt reduction; or reagent hydroperoxide previously prepared can be used.

The aldehydes used as reactants in accordance with the process of this invention can be any organic aldehyde and include for purposes of illustration, but are not limited to those aldehydes of the formula

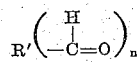

(wherein $n$ is 1 or 2)

wherein the $C_1$ to $C_{20}$ alkyl radicals include methyl, ethyl, propyl, isopropyl, n-butyl, isobutyl, t-butyl, amyl, isoamyl, hexyl, isohexyl, heptyl, octyl, nonyl, and decyl radicals; the $C_3$ to $C_8$ alkylene radicals include propenyl, 1-butenyl, 2-butenyl, 3-butenyl, isobutenyl, 1-isopentenyl, 2-pentenyl, 1-hexenyl, 2-hexenyl, 1-heptenyl, 2-heptenyl, 1-octenyl and 2-octenyl radials; the $C_6$ to $C_{18}$ aryl radicals include phenyl, naphthyl, anthryl and phenanthryl; the $C_1$ to $C_6$-alkyl-substituted $C_6$ to $C_{18}$-aryl radicals include o-tolyl, m-tolyl, p-tolyl, xylyl, methyl-, ethyl-, and propyl-naphthyl radicals, methyl-, ethyl-, and propyl phenanthryl radicals; the $C_6$ to $C_{18}$ aryl-substituted $C_1$ to $C_6$-alkyl radicals include benzyl, phenethyl, phenepropyl and the like; the $C_3$ to $C_9$ cycloaliphatic radicals include cyclopropyl, cyclobutyl, cyclopentyl, cyclohexyl, cycloheptyl and the heterocyclic radicals include furyl, thiofuryl, pyrryl, oxazolyl, thiazolyl, imidazolyl, pyridyl, benzofuryl, and isobenzofuryl radicals, all of which contain or do not contain such non-interfering or other substituent groups as hydroxyl, nitro, sulfo, lower alkyl (that is $C_1$ to $C_3$ alkyl) and corresponding alkoxy groups and the like as the definition of the R' group. The invention is also to be understood to be directed to the use of aldehydes having R' groups as thus defined.

Examples of various groups of organic aldehydes that can be used to carry out this invention are the aliphatic aldehydes, alicyclic aldehydes, aromatic aldehydes, heterocyclic aldehydes, olefinic aldehydes such as the aliphatic olefinic aldehydes and the alicyclic olefinic aldehydes, aromatic olefinic aldehydes, heterocyclic olefinic aldehydes, halo aldehydes, aromatic halo aldehydes, the hydroxy aldehydes to include aliphatic hydroxy aldehydes, aromatic hydroxy aldehydes, the aldo ethers and the aromatic aldo ethers.

Examples of species of aldehydes that can be used in carrying out this invention are acetaldehyde, propionaldehyde, isobutyraldehyde, trimethylacetaldehyde, n-butyraldehyde, decanal, n-valeraldehyde, isovaleraldehyde, methylethylacetaldehyde, stearaldehyde, n-caproaldehyde, n-heptaldehyde, methyl-n-propylacetaldehyde, acrolein, isobutylacetaldehyde, diethylacetaldehyde, undecanal, hexadecanal, eicosanal, crotonaldehyde, benzaldehyde, furfural, m-tolualdehyde, o-tolualdehyde, p-tolualdehyde, phenylacetaldehyde, α-phenylpropionaldehyde, o-chlorobenzaldehyde, o-nitrobenzaldehyde, m-nitrobenzaldehyde, p-nitrobenzaldehyde, o-aminobenzaldehyde, p-aminobenzaldehyde, salicylaldehyde, m-hydroxybenzaldehyde, p-hydroxybenzaldehyde, o-methoxybenzaldehyde, 2-phenanthraldehyde, 3-phenanthraldehyde, 9-phenanthraldehyde, 1,2,3,4-tetrahydrophenanthrene-3-aldehyde, 2,4,6-triisopropyl-benzaldehyde, pyrene-3-aldehyde, 1,2-benzanthracene-10-aldehyde, 3,4-benzpyrene-5-aldehyde, anisaldehyde, citral, p-dimethyl aminobenzaldehyde, vanillin, 2-hydroxy-3-methoxy-benzaldehyde, piperonal, β- resorcylaldehyde, β-naphthaldehyde, tetrahydrofurfuraldehyde, furfural, 3-furaldehyde, tetrahydrofurfuraldehyde, 2-thiophenealdehyde, 3-thenaldehyde, a-pyrrole aldehyde, 4-methylthiazole-5-aldehyde, 5-methylfurfural, 3-methyl-2-thiophenealdehyde, 5 - methyl-2-thiophenealdehyde, nicotinaldehyde β-furylpropionaldehyde, thianapthene-3-aldehyde, indole-3-aldehyde, coumarin-3-aldehyde, quinoline-2-aldehyde, quinoline-4-aldehyde, isoquinaldehyde, dibenzofuran-2-aldehyde, and the like. A preferred group of aldehydes for the reaction consists in propionaldehyde, butylaldehyde, isobutylaldehyde, decanal, benzaldehyde, o-tolualdehyde, β-naphthaldehyde, furfural, 1,2,3,4-tetrahydro-2-naphthaldehyde, and 2-aldo-benzothiazole.

Also included are the dialdehydes such as malonaldehyde, succinaldehyde, glutaraldehyde, adipic dialdehyde, phthaldehyde, isophthaldehyde, terephthaldehyde and the following aldehydes: methacrolein, 2-pentenal, β-methylcrotonaldehyde, 3-hexenal, 4-octenal, 2-ethyl-2-hexenal, 3,6-dihydro-o-tolualdehyde, 11-undecanal, β-furylacrolein, p-formylstyrene, stilbene-2-aldehyde, propargyl aldehyde, trifluoroacetaldehyde, α-bromoisobutyraldehyde, o-chlorobenzaldehyde, m-bromobenzaldehyde, p-trifluoromethylbenzaldehyde, 1-bromo-2-naphthaldehyde, glycoaldehyde, 4-hydroxybutanal, 3-methyl-3-hydroxybutanal, 9-hydroxynonanal, 3,4-dihydroxybenzaldehyde, benzylglycolic aldehyde, 1-naphthol-2-aldehyde, diphenylglycolic aldehyde, methoxyacetaldehyde, ethoxyacetaldehyde, 5-methoxyvaleraldehyde, phenoxyacetaldehyde, 3,4,5-trimethoxybenzaldehyde, m - benzyloxybenzaldehyde, and the like.

The use of reduction-oxidation conditions is essential to convert the peroxide compounds to the keto-carboxylic acid or ester products by reaction with the aldehyde. The term "redox" is used herein in its widely accepted sense to designate a reduction-oxidation system wherein an electron transfer takes place with the simultaneous formation of a free radical. In order for this transfer to take place, it is necessary that there be present in the reaction mixture a substance or substances which act as a reducing agent for the peroxide compound. Those heavy metals which are capable of existing in several valence states such as iron, chromium, manganese, cobalt, copper and molybdenum are suitable reducing agents for this purpose when they are in their lower valence states. Certain organic and inorganic compounds may also be used such as sodium bisulfate, the reducing sugars, l-ascorbic acid, sodium formaldehyde sulfoxylate and other reducing agents which are commonly known and used in the redox art.

The invention will be illustrated by a number of examples using the ferrous ion as the redox agent; however, it is not to be limited thereby and any of the aforegoing reducing agents may be used, or other reducing agents as are known in the prior art. In general, when using a heavy metal such as the ferrous ion, the amount of the ion is equivalent to or in excess of the amount of peroxide to be reacted. The heavy metal ions also may be used in trace amounts as promoters with any one of the aforementioned reducing agents, which serve to convert ferric ions to the ferrous ion as fast as the ferric ion is produced. Because of low cost, availability and efficiency, the ferrous ion is preferred for the reaction.

The reaction of this invention for the conversion of cyclic peroxide compounds to the ketocarboxylic acids or the ester can be carried out in various solvents such as water, methanol, ethanol, tertiary butanol, aromatic solvents, ethers, esters, ketones, dioxane or other solvent mixtures.

When alcohols are used as the solvent the keto product is in the form of the corresponding esters. For this purpose any of the liquid aliphatic alcohols can be used and if desired the keto acid products can be converted to the ester form by known esterification procedures. Accordingly this invention also encompasses the aliphatic, aromatic and cycloaliphatic esters of the keto acid products, as illustrated by, but not limited to, the methyl, ethyl, propyl, butyl, amyl, hexyl, heptyl, benzyl, phenyl, naphthyl, anthryl, $C_3$–$C_6$ cycloaliphatic and related esters.

The reaction may also be carried out in the emulsion state. Pressures above or below atmospheric may be used. Pressures higher than atmospheric are advantageous where a relatively volatile solvent is used in the liquid phase. In general, the reaction proceeds at atmospheric pressure and at temperatures in the range of −100° C. to 100° C. The preferred temperature range is −30° C. to 60° C. with best results being obtained at −20° C. to 20° C.

In order to illustrate the invention, a number of examples are given:

EXAMPLE I

A two-liter reaction flask was charged with 750° cc. of methanol, 100 g. of cyclohexanone and 57 g. of 30% hydrogen peroxide with stirring. After this mixture had been cooled to 0° C., 25 cc. of concentrated sulfuric acid was added (dropwise) followed by 54.7 g. of propionaldehyde. Finally, a solution of 147 g. of ferrous sulfate heptahydrate in 300 cc. of distilled water and 25 cc. of concentrated sulfuric acid was added slowly (dropwise) while maintaining temperature at about 0° C.

After all the ferrous salt solution had been added, the material was diluted with 1000 cc. of distilled water, an organic non-methanol phase separated and was collected. The aqueous-methanol phase was extracted with benzene and the benzene extractions combined with the organic non-methanol material. The crude product was water washed, dried over calcium sulfate, and distilled at reduced pressure.

The desired methyl 7-ketononanoic acid was collected within an overhead temperature range of 75° to 90° C. at 20 mm. Hg pressure.

$n_D^{20}$ 1.4274

*Analysis.*—Calc'd for $C_{10}H_{18}O_3$: C, 64.7; H, 9.7. Found: C, 64.7; H, 10.6.

Using standard analytical techniques saponification of the keto ester was extremely slow. Saponification number found 246. The 2,4-dinitrophenyl hydrazone derivative was prepared to verify the presence of the ketone group. M.P. 128° C.

*Reaction of cyclohexanone peroxide with other aldehydes*

Various aldehydes (0.5 mole) were added to the freshly prepared hydroperoxide solution. It was followed by the dropwise addition of the ferrous salt solution over a period of 2 hours while the reaction mixture was rapidly stirred at 0°. The ferrous salt solution was prepared immediately before using by dissolving 147 g. (0.53 mole) of ferrous sulfate heptahydrate and 25 ml. of sulfuric acid in 300 ml. of water. The reaction mixture was diluted with 2 l. of water and the organic phase was extracted several times with benzene. The benzene extract was washed with water and dried over anhydrous calcium sulfate, filtered and distilled to remove the solvent and unreacted reagents. The residue was refluxed with 200 ml. of methanol and 1 g. of p-toluene sulfonic acid catalyst for 14 hours. The resulting ester was diluted with water and extracted with benzene. The benzene extract was water washed and dried over anhydrous calcium sulfate. The solution was filtered; the benzene was distilled off and the product was fractionated through a 12 in. Vigreux column.

The keto carboxylic esters were identified by the preparation of their 2,4-dinitrophenylhydrazone derivatives. Methyl dodecanedioate was identified by its elemental analysis and infrared spectrum. Its infrared spectrum was identical with that of an authentic sample of methyl dodecanedioate.

The results, including those from Example I, are shown in the table.

TABLE.—KETO-ESTERS PREPARED FROM VARIOUS ALDEHYDES AND CYCLOHEXANONE PEROXIDE

| Aldehyde | Product | B.P., °C. | Yield, percent | 2,4-DNP, M.P., °C. |
|---|---|---|---|---|
| $CH_3CH_2CHO$ | $CH_3CH_2CO(CH_2)_5COOCH_3$<br>Methyl-7-ketononanoate | 75–99 at 20 mm | 9 | 123 |
| $CH_3(CH_2)_2CHO$ | $CH_3(CH_2)_2CO(CH_2)_5COOCH_3$<br>Methyl-7-ketodecanoate | 106 at 18 mm | 25 | 121-2 |
| $(CH_3)_2CHCHO$ | $(CH_3)_2CHCO(CH_2)_5COOCH_3$<br>Methyl-8-methyl-7-ketononanoate | 103–106 at 15 mm | 33 | 180-1 |
| $(CH_3)_2CHCH_2CHO$ | $(CH_3)_2CH-CH_2CO(CH_2)_5COOCH_3$<br>Methyl-9-methyl-7-ketodecanoate | 75–84 at 23 mm | 11 | 94 |
| $CH_3(CH_2)_5CHO$ | $CH_3(CH_2)_5CO(CH_2)_5COOCH_3$<br>Methyl-7-ketotridecanoate | 166–176 at 20 mm | 20 | 128 |
| $C_6H_5CHO$ | $C_6H_5CO(CH_2)_5COOCH_3$<br>Methyl-7-(phenyl)-7-ketoheptanoate | 58 at 20 mm | 26 | 234 |
| $P-HOC_6H_4CHO$ | $HOC_6H_4CO(CH_2)_5COOHC_3$<br>Methyl-7-(4-hydroxyphenyl)-7-ketoheptanoate | 50–51 at 18 mm | 20 | 159 |
| 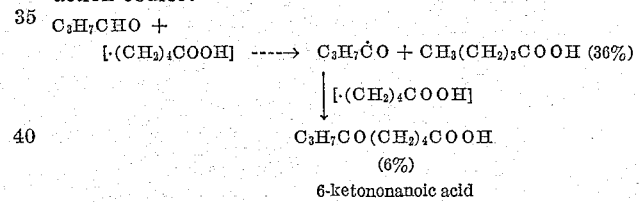 | $C_4H_3O-CO(CH_2)_5COOCH_3$<br>Methyl-7(2-furyl)-7-ketoheptanoate | 42–61 at 20 mm | 23 | 147 |

The reactions described herein may be carried out batchwise or continuously and mixed reactants may be used. In general, however, where it is desired to transform the end products to salts or esters, it is preferred that only single products be made. Since the peroxide or hydroperoxide reactants are sensitive to shock, the usual precautions should be taken to avoid an explosion. The reaction is best carried out in a sealed or tubular reactor with the cold peroxide compound being fed therein to mix with the acid reactant, redox reducing agent and solvent. Other techniques may be used without departing from the spirit of the invention. Although sulfuric acid has been used as the mineral acid, other acids such as nitric acid, the haloacids, acetic acid, chloroacetic acid and equivalent acids may be used.

The reaction is carried out merely by mixing the reactants in the presence of the redox reducing agent, which contacting is facilitated by the use of a solvent. In general, the reactants are brought together in amounts such that the aldehyde is present in at least the stoichiometric amount needed to react with all of the peroxide and preferably in a slight excess, i.e., about 0.01 to 0.10 mole excess. The redox reducing agent and mineral acid may be mixed with water and the combination added to the solvent contacting the peroxide and unsaturated acid. The rate of mixing is controlled by slow addition, agitation and the heat of reaction dissipated by cooling. An amount of mineral acid is added to maintain a distinctly acid solution which will require about 50 cc. of concentrated acid per mole of total reactants. When the ferrous ion is the reducing agent, methanol is the preferred solvent. When water-soluble ferrous salts are used, the reaction may be carried out in an aqueous alcoholic medium in which contact between the two liquid phases is maintained by stirring. The products are removed by solvent extraction and may be further purified by conversion to salts and removal of neutral organic materials, followed by regeneration of free acid with mineral acid, or by ion-exchange techniques. The ferric ion by-product of the reaction can be recovered by precipitation, ion-exchange, or by reduction and recycling to the process.

Thus, although the ferrous salt decomposition of tertiary cycloalkyl hydroperoxides is known to result in ring cleavage and dimerization to form straight chain difunctional compounds, by conducting the ferrous salt reduction of these hydroperoxides in the presence of aldehydes in accordance with this invention the amount of its dimerization was substantially reduced and new additive products were obtained. These new additive products were ketoalkanoic acids and esters derived from only one alicyclic molecule.

The formation of dodecanedioic acid from cyclohexanone peroxide in the liquid phase has been explained as a radical dimerization. The rate of formation of the radical intermediate is governed by the rate of addition of ferrous salt solution. The identification of the principal products makes it clear that radical transfer reactions and disproportionation do not compete favorably with dimerization. However, when an aldehyde is present, it is here proposed that the alkyl radical abstracts the hydrogen atom located on the carbon atom of the carbonyl group, transferring the radical activity to the aldehyde reagent. This new radical can be converted to a stable compound by combination with one of the alkyl radicals thus forming a keto-carboxylic acid.

This is confirmed by analyses of the reaction products using cyclopentanone peroxide and butyraldehyde in one experiment which indicated the following yields and reaction course:

$C_3H_7CHO +$ $[\cdot(CH_2)_4COOH] \longrightarrow C_3H_7\dot{C}O + CH_3(CH_2)_3COOH$ (36%)

$\downarrow [\cdot(CH_2)_4COOH]$ $C_3H_7CO(CH_2)_4COOH$
(6%)
6-ketononanoic acid Using other aldehyde, dialdehyde and peroxide combinations compounds of the following structures are formed:

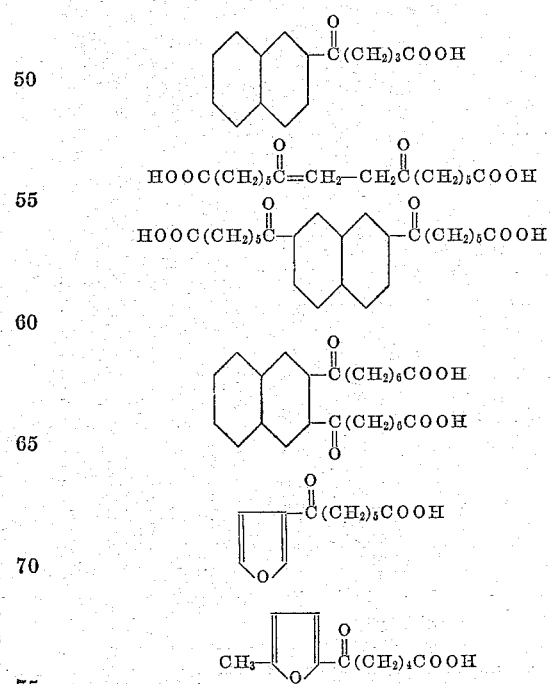

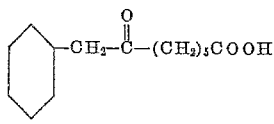

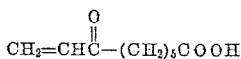

The embodiments of this invention in which an exclusive property or privilege is claimed are defined as follows:

1. The process which comprises converting a compound of the formula (I)   $\underset{R}{\underset{|}{C}}\diagup\underset{OOH}{\overset{X}{}}$ into a compound of the formulae (II)   $R'-\overset{O}{\underset{\|}{C}}-R-\overset{O}{\underset{\|}{C}}-X$ and (III)   $X-\overset{O}{\underset{\|}{C}}-R-\overset{O}{\underset{\|}{C}}-R'-\overset{O}{\underset{\|}{C}}-R-\overset{O}{\underset{\|}{C}}-X$ wherein in said formulae, X is a member of the group consisting of hydroxyl and $C_1$ to $C_6$ alkyl, R is a member of the group consisting of $C_3$ to $C_9$ cycloalkylene, $C_1$–$C_4$ alkyl-, phenyl-, benzyl-, hydroxy-, carboxyl-, oxo-, $C_1$ to $C_6$ alkoxy-, cycloalkyl-, and halo-substituted $C_3$ to $C_9$ cycloalkylene,

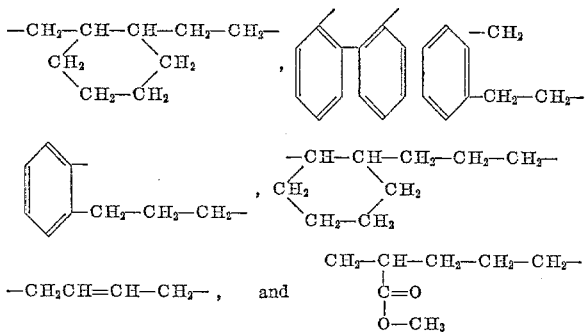

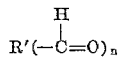, and $\underset{\underset{O-CH_3}{\underset{|}{C=O}}}{\underset{|}{CH_2-CH-CH_2-CH_2-CH_2-}}$ R' is a member of the group consisting of $C_1$ to $C_{20}$ alkyl, $C_2$ to $C_8$ alkylene, $C_6$ to $C_{18}$ aryl, $C_1$ to $C_6$ alkyl-substituted $C_6$ to $C_{18}$ aryl, $C_6$ to $C_{18}$ aryl-substituted $C_1$ to $C_6$ alkyl, $C_3$ to $C_9$ cycloalkyl, furyl, thiofuryl, pyrryl, oxazolyl, thiazolyl, imidazolyl, pyridyl, benzofuryl, isobenzofuryl and the hydroxy, nitro, sulfo, lower alkyl, and lower alkoxy-substituted forms thereof which comprises reacting a compound of Formula I with an aldehyde of the formula $$R'(-\overset{H}{\underset{|}{C}}=O)_n$$

wherein R' is as above-defined and n is an integer of 1 to 2, under redox conditions at a temperature of about −100° C. to 100° C. and separating compounds of Formula I when n is 1 and compounds of Formula II when n is 2.

2. The process in accordance with claim 1 in which R is $C_3$ to $C_9$ cycloalkylene and R' is $C_1$ to $C_{20}$ alkyl.

3. The process in accordance with claim 1 in which X is a $C_1$ to $C_6$ alkyl group.

4. The process in accordance with claim 1 in which X is hydroxyl.

5. The process in accordance with claim 1 in which said reaction is conducted in the presence of a redox reducing agent comprising a heavy metal ion capable of existing in several valence states.

6. The process in accordance with claim 5 in which the heavy metal ion is selected from the group consisting of the ferrous ion, chromous ion, manganous ion, cobaltous ion, and the cuprous ion, same being obtained from salts of these metals.

7. The process of producing 7-ketononanoic acid which comprises reacting propionaldehyde with cyclohexanol hydroperoxide at a temperature of about −100° C. to 100° C. in the presence of a redox reducing agent comprising a heavy metal ion capable of existing in several valence states.

8. The process of producing 7-ketodecanoic acid which comprises reacting butyraldehyde with cyclohexanolhydroperoxide at a temperature of about −100° C. to 100° C. in the presence of a redox reducing agent comprising a heavy metal ion capable of existing in several valence states.

9. The process of producing 9-methyl-7-ketononanoic acid which comprises reacting isobutyraldehyde with cyclohexanolhydroperoxide at a temperature of about −100° C. to 100° C. in the presence of a redox reducing agent comprising a heavy metal ion capable of existing in several valence states.

10. The process of producing 2-methyl-7-keto decanoic acid which comprises reacting isoamylaldehyde with cyclohexanol hydroperoxide at a temperature of about −100° C. to 100° C. in the presence of a redox reducing agent comprising a heavy metal ion capable of existing in several valence states.

11. The process of producing 7-keto-tridecanoic acid which comprises reacting heptaldehyde with cyclohexanol hydroperoxide at a temperature of about −100° C. to 100° C. in the presence of a redox reducing agent comprising a heavy metal ion capable of existing in several valence states.

12. The process of producing 7-keto-7-p-hydroxyphenyl heptanoic acid which comprises reacting p-hydroxybenzaldehyde with cyclohexanol hydroperoxide at a temperature of about −100° C. to 100° C. in the presence of a redox reducing agent comprising a heavy metal ion capable of existing in several valence states.

13. The process of producing 7-keto-7-phenyl heptanoic acid which comprises reacting benzaldehyde with cyclohexanol hydroperoxide at a temperature of about −100° C. to 100° C. in the presence of a redox reducing agent comprising a heavy metal ion capable of existing in several valence states.

14. The process of producing 7-keto-7-furfuryl heptanoic acid which comprises reacting 2-furfural with cyclohexanol hydroperoxide at a temperature of about −100° C. to 100° C. in the presence of a redox reducing agent comprising a heavy metal ion capable of existing in several valence states.

References Cited by the Examiner

Hawkins et al.: J. Chem. Soc., London (1950), pp. 2804–08.

NICHOLAS S. RIZZO, *Primary Examiner.*

UNITED STATES PATENT OFFICE
CERTIFICATE OF CORRECTION

Patent No. 3,197,488　　　　　　　　　　　　　July 27, 1965

John B. Braunwarth et al.

It is hereby certified that error appears in the above numbered patent requiring correction and that the said Letters Patent should read as corrected below.

Column 4, line 71, for "1,2,3,4-tetrahydrophenanthrene-3-aldehyde" read -- 1,2,3,4-tetrahydrophenanthrene-9-aldehyde --; column 6, line 16, for "750° cc." read -- 750 cc. --; columns 7 and 8, in the table, heading to the fourth column, for "Yield, percent" read -- Yield, Mol percent --.

Signed and sealed this 8th day of March 1966.

(SEAL)
Attest:

ERNEST W. SWIDER　　　　　　　　　　　　　EDWARD J. BRENNER
Attesting Officer　　　　　　　　　　　　　Commissioner of Patents